United States Patent
Mulryan et al.

(10) Patent No.: US 11,645,928 B2
(45) Date of Patent: May 9, 2023

(54) METHOD OF USING MULTIPLE APPROACH GUIDANCE SYSTEMS TO PROVIDE HIGHER INTEGRITY WITH IMPROVED PERFORMANCE AND AVAILABILITY

(71) Applicant: Honeywell International Inc., Charlotte, NC (US)

(72) Inventors: Robert Mulryan, Eudora, KS (US); John D. Savoy, Jr., Olathe, KS (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 242 days.

(21) Appl. No.: 17/035,217

(22) Filed: Sep. 28, 2020

(65) Prior Publication Data
US 2022/0101739 A1 Mar. 31, 2022

(51) Int. Cl.
*G08G 5/02* (2006.01)
*B64D 45/00* (2006.01)
*G08G 5/00* (2006.01)

(52) U.S. Cl.
CPC ............. *G08G 5/025* (2013.01); *B64D 45/00* (2013.01); *G08G 5/0013* (2013.01); *G08G 5/0039* (2013.01)

(58) Field of Classification Search
CPC .... G08G 5/025; G08G 5/0013; G08G 5/0039; B64D 45/00; G01S 19/15; G01S 19/20; G01S 19/49; G01S 19/07; G05D 1/0077
See application file for complete search history.

(56) References Cited

U.S. PATENT DOCUMENTS 7,546,183 B1  6/2009  Marcum
8,374,737 B2  2/2013  Takacs et al.
(Continued)

FOREIGN PATENT DOCUMENTS

EP    2037344 A2    3/2009

OTHER PUBLICATIONS

J. Wu, Z. Zhou, J. Chen, H. Fourati and R. Li, "Fast Complementary Filter for Attitude Estimation Using Low-Cost MARG Sensors," in IEEE Sensors Journal, vol. 16, No. 18, pp. 6997-7007, Sep. 15, 2016, doi: 10.1109/JSEN.2016.2589660 (Year: 2016).*
(Continued)

*Primary Examiner* — Shon G Foley
(74) *Attorney, Agent, or Firm* — Fogg & Powers LLC

(57) ABSTRACT

A method comprises receiving an ILS transmission signal in an onboard ILS receiver during an aircraft approach, and receiving a GNSS position signal in an onboard GNSS augmentation system receiver during the approach. The method determines a first set of flight path deviations based on the ILS transmission signal, and a second set of flight path deviations based on the GNSS position signal. The first set of flight path deviations are sent to a first complementary filter, which outputs a first filtered deviations signal. The second set of flight path deviations is sent to a second complementary filter, which outputs a second filtered deviations signal. A scale factor is applied to the first filtered deviations signal or the second filtered deviations signal, such that the filtered deviations signals are normalized to the
(Continued)

same scale. The method combines the normalized filtered deviations signals to produce a hybrid signal for further processing.

19 Claims, 4 Drawing Sheets

(56) References Cited

U.S. PATENT DOCUMENTS

| | | | |
|---|---|---|---|
| 9,097,529 | B2 | 8/2015 | Shehi et al. |
| 9,257,050 | B2 | 2/2016 | Fleiger-Holmes et al. |
| 9,395,446 | B2 | 7/2016 | Rollet et al. |
| 9,646,506 | B2 | 5/2017 | Ishihara et al. |
| 9,728,094 | B2 | 8/2017 | Hanel et al. |
| 10,089,892 | B2 | 10/2018 | McLees et al. |
| 10,094,682 | B2 | 10/2018 | He |
| 10,247,573 | B1 | 4/2019 | Gavrilets et al. |
| 10,459,085 | B1 | 10/2019 | Bell et al. |
| 10,473,791 | B1 | 11/2019 | Wang et al. |
| 2006/0167619 | A1 | 7/2006 | Arethens |
| 2015/0081143 | A1 | 3/2015 | Snow et al. |
| 2018/0261110 | A1 | 9/2018 | Dautermann et al. |

OTHER PUBLICATIONS

W. T. Higgins, "A Comparison of Complementary and Kalman Filtering," in IEEE Transactions on Aerospace and Electronic Systems, vol. AES-11, No. 3, pp. 321-325, May 1975, doi: 10.1109/TAES.1975.308081 (Year: 1975).*

Ackland et al., "Global Navigation Satellite System Landing System", Technology/Product Development, Jan. 2003, pp. 1-9.

Higgins, Jr., "A Comparison of Complementary and Kalman Filtering", IEEE Tranactions on Aurespace and Electronic Systems, May 1975, pp. 321 through 325, vol. AES-11, No. 3, IEEE.

Almasi et al., "The Exact Distribution of Sums Weights of Gamma Variables", Journal of the Iranian Statistical Society, Jan. 2012, pp. 23 through 37, vol. 11, No. 1.

Di Salvo, "The exact distribution of the Weighted Convolution of Two Gamma distributions", at least as early as Mar. 18, 2008, pp. 511 through 514.

European Patent Office, "Extended European Search Report from EP Application No. 21196177.6", from Foreign Counterpart to U.S. Appl. No. 17/035,217, filed Feb. 23, 2022, pp. 1 through 8, Published: EP.

* cited by examiner

METHOD OF USING MULTIPLE APPROACH GUIDANCE SYSTEMS TO PROVIDE HIGHER INTEGRITY WITH IMPROVED PERFORMANCE AND AVAILABILITY

BACKGROUND

Aircraft operators continue to look for ways to improve guidance system integrity to allow aircraft landings in lower visibility situations. Typically, only a single approach method is used on aircraft, such as an instrument landing system (ILS), a microwave landing system (MLS), a localizer performance with vertical guidance (LPV), or a ground based augmentation system (GBAS) landing system (GLS).

The ILS and MLS use an independent system to receive the lateral and glideslope radio frequency (RF) signals for deviation calculations. Global Positioning System (GPS) approach deviations (used in LPV or GLS) are calculated based on GPS position and information from a final approach segment (FAS) database.

During the landing phase of an aircraft, it is necessary to know if any of the landing systems in use are misbehaving or operating incorrectly. A particular misbehavior of interest during the landing phase is known as "spoofing." In a spoofing situation, a bad actor creates a signal that mimics the GPS signal, which can mislead GPS equipment in the area into outputting information that is dangerous and misleading.

SUMMARY

A method comprises receiving an in-flight instrument landing system (ILS) transmission signal in an onboard ILS receiver during an aircraft approach, and receiving an in-flight global navigation satellite system (GNSS) position signal in an onboard GNSS augmentation system receiver during the aircraft approach. The method determines a first set of flight path deviations for the aircraft approach based on the ILS transmission signal, and a second set of flight path deviations for the aircraft approach based on the GNSS position signal. The first set of flight path deviations are sent to a first complementary filter, which is operative to output a first filtered deviations signal. The second set of flight path deviations is sent to a second complementary filter, which is operative to output a second filtered deviations signal. A scale factor is applied to the first filtered deviations signal or the second filtered deviations signal, such that the first and second filtered deviations signals are normalized to the same scale. The method then combines the normalized first and second sets of filtered deviations signals to produce a hybrid signal. A test statistic can be generated for the hybrid signal, and the test statistic compared to a threshold to determine whether an integrity or safety issue exists.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1A:
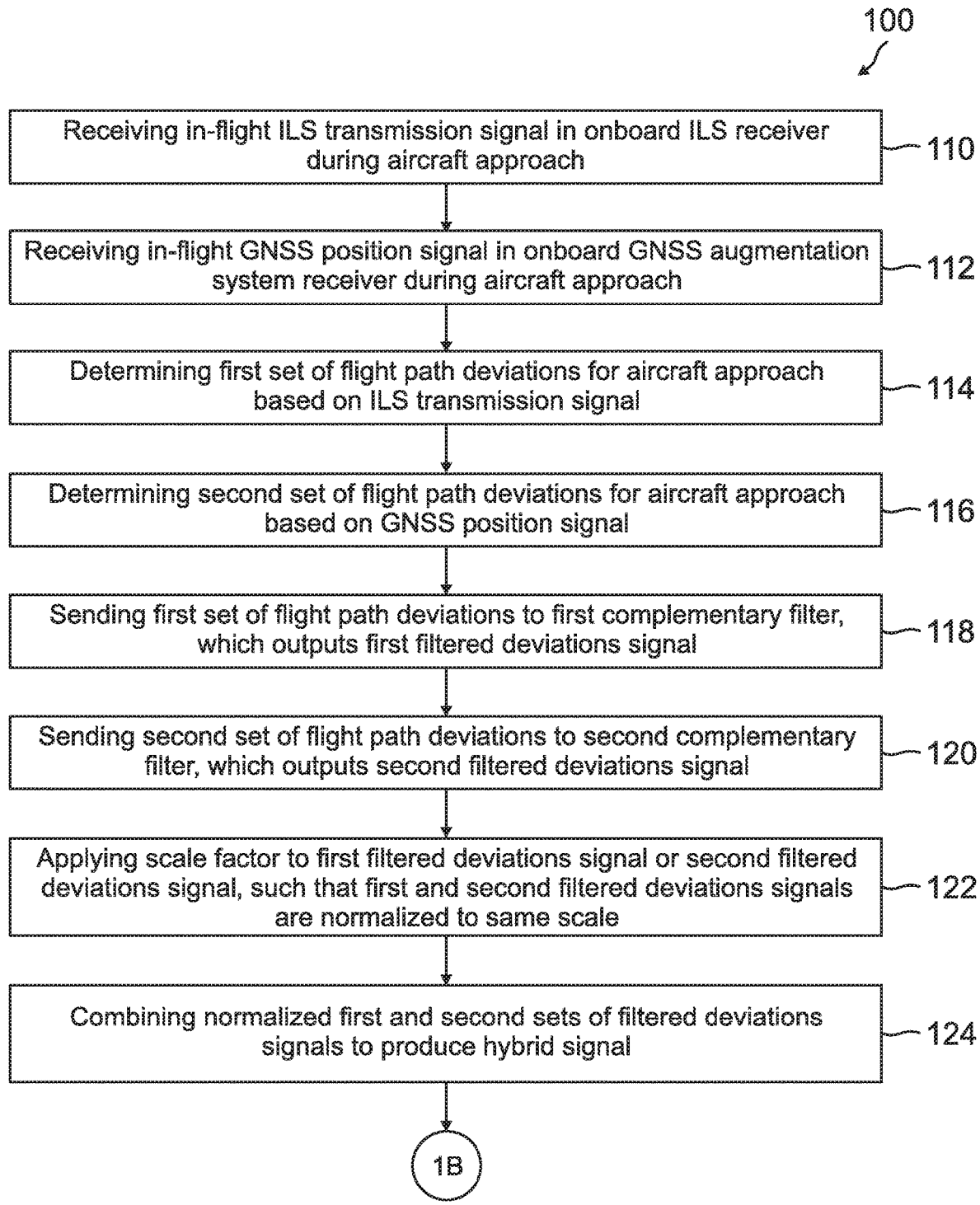
FIGS. 1A and 1B are flow diagrams of a method for using multiple approach guidance systems, according to an exemplary implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Methods of using and combining multiple approach guidance systems are described herein in order to provide higher integrity with improved performance and availability. The improved integrity, performance, availability, and possibly minima, provides the capability to land aircraft in situations where it has not previously been feasible to land.

The present methods and systems allow global navigation satellite system (GLASS) data such as GPS data to be independently verified in case of a spoofing situation, where an invalid position is being broadcast to the GPS system. Also, the present methods provide the ability to detect GPS spoofing when published GLS/LPV approaches are aligned with the published ILS or MLS approaches, but the differing approach systems provide guidance that is significantly different.

During the aircraft approach, the deviations from the different approach guidance systems are combined to provide monitoring and integrity, with the additional assurance that the aircraft is properly aligned with the approach beam. This also provides the benefit of determining if the GPS is being spoofed. Care needs to be taken when combining deviation data due to the differences between scaling of the different approach types. The deviations need to be normalized to the same scale prior to the combining of the data.

The deviation data from each approach guidance type is combined to provide a hybrid solution for the deviations, thus filtering out anomalies associated with each approach guidance type to provide higher performance with a more consistent and accurate deviation output. Both the ILS and GPS solutions have their own shortcomings, but combining the ILS and GPS signals into a hybrid solution helps to cover those shortcomings.

Since the ILS is less accurate the farther it is from the runway, a weighted solution based on the hybrid solution can be used to provide the approach deviations, giving a more accurate and higher integrity solution. For example, a weighted portion of the GLS solution and a weighted portion of the ILS solution can be combined together to take advantage of the best characteristics of both.

The final flight path deviation data is computed based on the hybrid solution and provided to a flight control system where it will reside for immediate consumption. This data is generally also available to displays and flight data recording functions.

The enhanced integrity of the deviations from the different approach guidance systems can allow for a lower decision height for the pilot to see the runway before aborting the approach. This would require coordination through the industry and approval by certification authorities.

The present methods can provide for improved aircraft landing approaches with equipment that is already installed in an aircraft, and often in the same onboard avionics unit. For example, the present techniques can be added as a software upgrade to existing avionics systems, or added as a feature in new systems.

Further details of various embodiments are described hereafter with reference to the drawings.

As described in further detail hereafter, the present methods combine GNSS (GPS) signals and ILS signals to improve accuracy and integrity based on use of a complimentary filter scheme. Exemplary complementary filters are described in Higgins, *A Comparison of Complementary and Kalman Filtering*, IEEE Transaction on Aerospace and Electronic Systems, Vol AES-111, No. 3, May 1975, which is incorporated by reference herein. The present methods takes advantage of the long-term stability of the ILS beam that may be corrupted by short-term noise, and the higher stability of the GNSS-based beam.

Figure 1B:
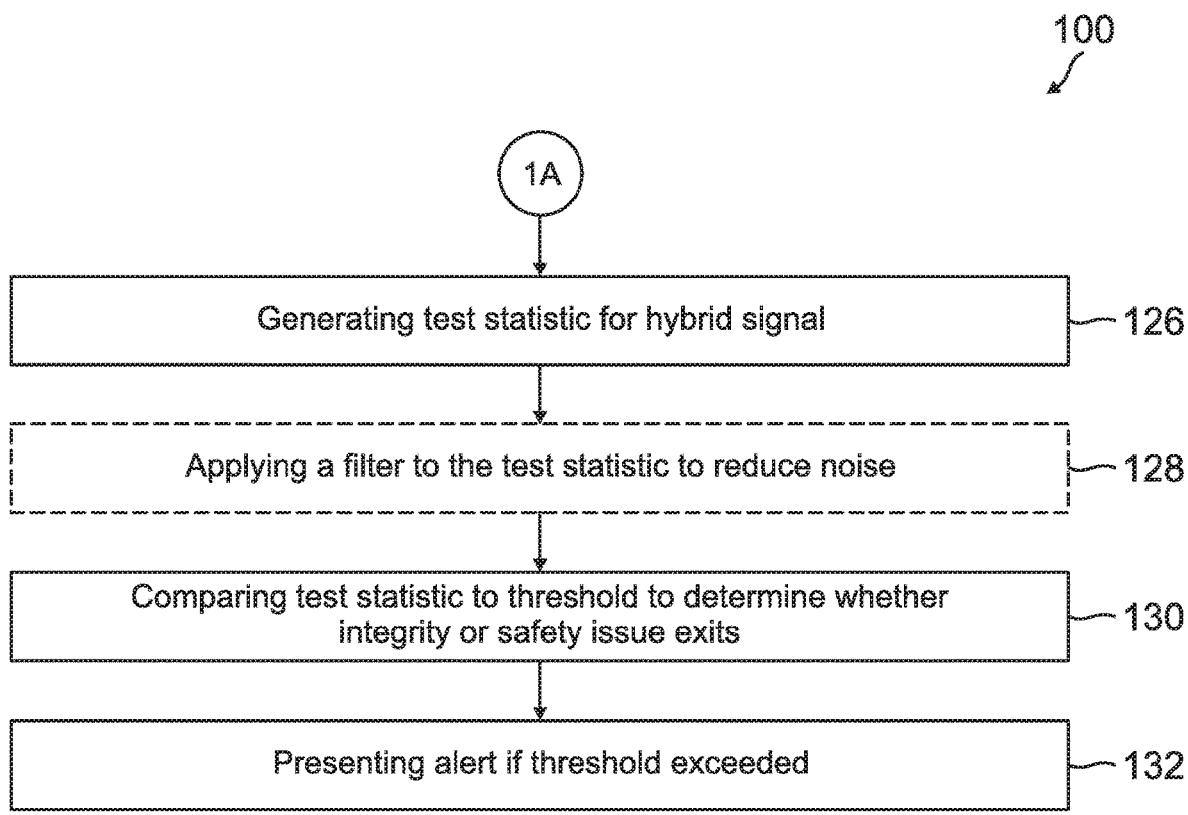

FIGS. 1A and 1B are flow diagrams of a method 100 for using multiple approach guidance systems, according to an exemplary implementation. As shown in FIG. 1A, method 100 includes receiving an in-flight ILS transmission signal in an onboard ILS receiver during an aircraft approach (block 110), and receiving an in-flight GNSS position signal in an onboard GNSS augmentation system receiver during the aircraft approach (block 112). The method 100 then determines a first set of flight path deviations for the aircraft approach based on the LLS transmission signal using a processor (block 114), and determines a second set of flight path deviations for the aircraft approach based on the GNSS position signal using the processor (block 116).

The first set of flight path deviations based on the WS transmission signal can be calculated using standard methods, such as defined in RTCA/DO-192, *Minimum Operational Performance Standards for Airborne ILS Glide Slope Receiving Equipment Operating Within the Radio Frequency Range of 328.6-335.4 MHz*, July 1986; and RTCA/DO-195, *Minimum Operational Performance Standards for Airborne ILS Localizer Receiving Equipment Operating Within the Radio Frequency Range of 108-112 MHz*, November 1986; both of which are incorporated by reference herein. The second set of flight path deviations based on the GNSS position signal can be calculated using a standard method, such as defined in RTCA/DO-253, *Minimum Operational Performance Standards for GPS Local Area Augmentation System Airborne Equipment*, Appendix C, July 2017, which is incorporated by reference herein.

The method 100 sends the first set of flight path deviations to a first complementary filter, which is operative to output a first filtered deviations signal (block 118), and sends the second set of flight path deviations to a second a complementary filter, which is operative to output a second filtered deviations signal (block 112). The method 100 applies a scale factor to the first filtered deviations signal or the second filtered deviations signal, such that the first and second filtered deviations signals are normalized to a same scale (block 122). The normalized first and second sets of filtered deviations signals are then combined to produce a hybrid signal (block 124).

For example, as the scaling of the GNSS and ILS systems need to match, the vertical scale of the GNSS can be modified from the 0.175 DDM (difference in the depth of modulation) full scale used for MLS to 0.22 DDM for ILS. A lateral offset for the glide path intercept point (GPIP) consistent with the offset of the glideslope antenna can be used in the ILS approach.

As shown in FIG. 1B, method 100 then generates a test statistic for the hybrid signal (block 126). Methods for generating the test statistic are described in further detail hereafter. Optionally, a filter can be applied to the test statistic to reduce noise (block 128). The test statistic is compared to a threshold level to determine whether an integrity or safety issue exists (block 130). The method 100 presents an alert if the threshold level is exceeded (block 132), such as on a cockpit display.

An example of generating a test statistic for the hybrid signal is described as follows. Given the measured ILS localizer deviation $l_{loc}$, and the blended localizer/GLS deviation $l_{blended}$, the residual $z_{loc}$ of the ILS localizer deviation is computed using the expression:

$$z_{loc} = l_{loc} - l_{blended}$$

Similarly, given the measured GLS localizer deviation $l_{GLS}$, the residual $z_{GLS}$ of the GLS lateral deviation is computed using the expression:

$$z_{GLS} = l_{GLS} - l_{blended}$$

The test statistic $t_{test}$ is then computed as the root-sum-square of the two residuals using the expression:

$$t_{test} = \sqrt{z_{loc}^2 + z_{GLS}^2}$$

If the ILS and GLS solutions were both exactly correct, then, of course, the test statistic would be zero. Instead, under normal, unspoofed conditions, each measurement will be corrupted by random noise. It is assumed for this derivation that the noise on both the ILS and GLS solutions is taken from a Gaussian, zero mean process. The standard deviation of each set of errors is a function of the noise present on those measurements. In the case of the GLS localizer measurement, the standard deviation can be assumed to be:

$$\sigma_{GLS} = \frac{LPL}{6}$$

for GBAS and $$\sigma_{GLS} = \frac{HPL_{SBAS}}{6}$$

for SBAS. These values are in meters and will need to be converted to DDM using the expression for lateral deviation defined in RTCA/DO-253, Appendix C. The standard deviation for the localizer deviation is derived from the 95% overbound of the localizer error as a function of distance described in ICAO Annex 10.

Given these assumptions, the expression for the test statistic can be rewritten as:

$$t_{test} = \sqrt{N^2(0, \sigma_{loc}) + N^2(0, \sigma_{GLS})}$$

The sum of two Gaussian random variates added in quadrature in this manner can be rewritten as the sum of two Gamma functions as follows:

$$t_{test}^2 = \sigma_{loc} N^2(0, 1) + \sigma_{GLS} N^2(0, 1)$$

$$t_{test}^2 = \sigma_{loc} \Gamma\left(\frac{1}{2}, 2\right) + \sigma_{GLS} \Gamma\left(\frac{1}{2}, 2\right)$$

The probability density function (PDF) for this random variate, $f_{test}$, is then given as equation 2 in Di Salvo, *The exact distribution of the Weighted Convolution of two Gamma distributions*, SIS 2006, 511-514; or as equation 1 in Almasi et al., *The Exact Distribution of Sums Weights of Gamma Variables*, Journal of the Iranian Statistical Society, 11(1): 23-37, January 2012; both of which are incorporated by reference herein. As the papers of Di Salvo and Almasi et al. demonstrate, this is a complex expression to compute, which will not be discussed further here except to note that there are several methods to find the associated probability density function, $f_{test}$, including those noted above.

Alternatively, it can be assumed that:

$$\sigma_{GLS} \approx \sigma_{loc} = \left[\frac{1}{2}(\sigma_{GLS} + \sigma_{loc})\right]$$

In this case, the sum is reduced to a simple Raileigh distribution. When making such an approximation, one would need to inflate the computed test statistic somewhat to avoid increasing the probability of false alarm unduly. The threshold for this test statistic, is computed using the expression:

$$P_{FA} = \int_{T_{limit}}^{\infty} f_{test} dx$$

where $P_{FA}$ is the desired false alarm rate, say $10^{-5}$/sample, $T_{limit}$ is the threshold against which the test statistic is compared, and $f_{test}$ is the probability density function previously discussed. This expression for $P_{FA}$ can be solved numerically in real time, or, more appropriately, as a look-up table, using, for example, the ratio $\sigma_{loc}/\sigma_{GLS}$, as the index variable. The glide slope would be tested separately in a similar manner, but noting that $\sigma_{glideslope}$ and $\sigma_{GLS\_Vert}$ would be different and so, too, would be the associated test statistic.

Figure 2:
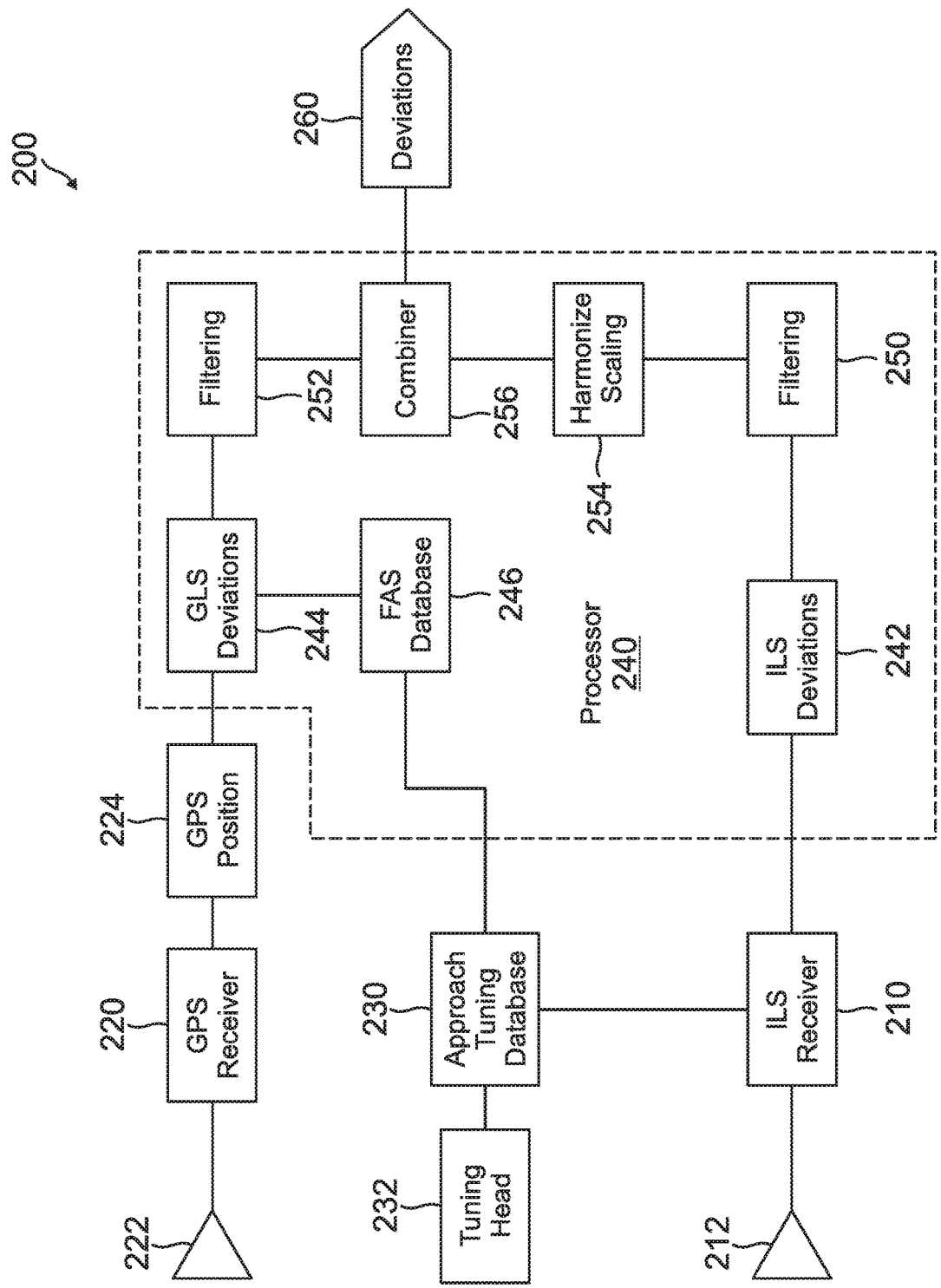
FIG. 2 is a block diagram of a combiner system for using multiple approach guidance systems, according to one embodiment.

FIG. 2 is a block diagram of a combiner system 200, according to one embodiment, which can be used to implement method 100 (FIG. 1). FIG. 2 illustrates an overview of the various functional components of combiner system 200.

The combiner system 200 includes an onboard ILS receiver 210 coupled to a first antenna 212 such as a glideslope antenna, and an onboard GNSS receiver such as a GPS receiver 220 coupled to a second antenna 222 such as a GPS antenna. An approach tuning database 230 is operatively coupled to a tuning head 232, which is configured to take the ILS or MLS tuned frequency and look up the corresponding final approach segment (FAS) datablock from an FAS database 246 for the co-located LPV. A similar approach is used to determine the GLS FAS datablock. The approach tuning database 230 is also operatively coupled to ILS receiver 210 to provide the Localizer and Glideslope frequencies. The FAS database 246 is operatively coupled to approach tuning database 230. The FAS database 246 provides the FAS datablock for the LPV approach to a GLS deviations block 244. Similarly, the FAS datablock is determined for the associated GLS approach. The combiner system 200 also includes a processor 240, which can be located in a flight computer, for example.

The ILS receiver 210 is responsive to in-flight reception of ILS transmission signals via antenna 212 during an aircraft approach. The ILS receiver 210 is operative to generate an ILS output signal that is sent to processor 240, which determines a set of ILS deviations data (block 242) based on the ILS output signal. For example, ILS receiver 210 is operative to receive lateral and glideslope radio frequency (RF) signals for the deviation calculations.

The GPS receiver 220 is responsive to in-flight reception of GPS signals via antenna 222 during the aircraft approach. The GPS receiver 220 is operative to generate a GPS position output signal (block 224) that is sent to processor 240. Thereafter, processor 240 determines a set of GLS deviations data (block 244) based on the GPS position output signal and on an input signal from FAS database 246.

A first filter unit 250 is operative to receive the ILS deviations data. The first filter unit 250 includes a first complementary filter, which is operative to output an ILS filtered deviations signal. A second filter unit 252 is operative to receive the GLS deviations data. The second filter unit 252 includes a second complementary filter, which is operative to output a GLS filtered deviations signal. The complementary filters are described in further detail hereafter.

A harmonize scaling module 254 can be coupled to an output of first filter unit 250 The harmonize scaling module 254 is operative to provide that the scaling of the ILS and GPS signals is matched. Alternatively, a harmonize scaling module can coupled to an output of second filter unit 252, to provide that scaling of the ILS and GPS signals is matched. The harmonize scaling module applies a scale factor to the ILS filtered deviations signal (or GLS filtered deviations signal), such that both the ILS and GLS filtered deviations signals are normalized to the same scale.

A combiner 256 is operative to receive and combine the normalized ILS and GLS filtered deviations signals. The combiner 256 then outputs a set of combined deviations 260 in a hybrid signal, which can be used for further navigation processing.

For example, a test statistic can be generated for the hybrid signal as described previously. The test statistic can be compared to a threshold level to determine an integrity level or whether a safety issue exists, and an alert can be presented to a pilot if the threshold level is exceeded. Use of a complementary filter to combine ILS deviations with GLS deviations provides a mechanism to develop the test statistic, which allows the determination of whether or not one or both of the signals has been corrupted.

As described above, the GNSS (GLS) derived deviations and the ILS deviations are fed through a complementary filter, which can be represented by the following expression:

$$ILSdev \times G_{ILS} + GLSdev \times (1-G_{ILS})$$

The complementary filter has two inputs that provide different observations of the same phenomenon, each with different error characteristics.

Figure 3:
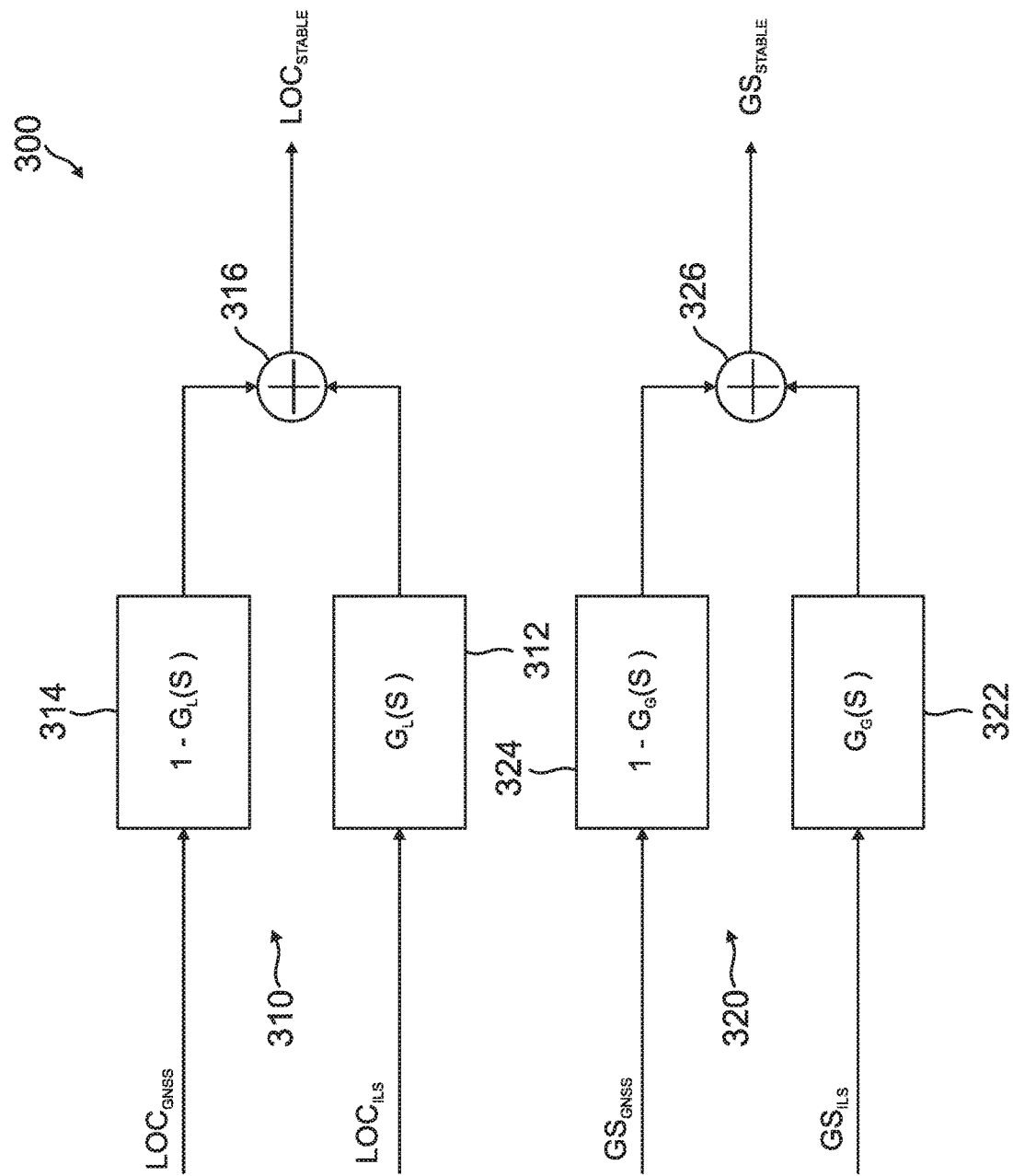
FIG. 3 is a block diagram of a complementary filter configuration, which can be implemented in the combiner system of FIG. 2.

FIG. 3 is a block diagram of a complementary filter configuration 300, which can be implemented in the filter units of combiner system 200. The complementary filter configuration 300 includes a first complementary filter 310 having a low pass filter 312 ($G_L(S)$) for ILS or MLS localizer data, and a high pass filter 314 ($1-G_L(S)$) for LPV or GLS lateral data. The complementary filter 310 is configured to receive lateral deviations data. The complementary filter configuration 300 also includes a second complementary filter 320 having a low pass filter 322 ($G_G(S)$) for ILS or MLS glideslope data, and a high pass filter 324 ($1-G_G(S)$) for LPV or GLS vertical data. The complementary filter 320 is configured to receive vertical deviations data.

As shown in FIG. 3, a ILS or MLS localizer deviations signal ($LOC_{ILS}$) is fed to low pass filter 312 ($G_L(S)$), and a LPV or GLS lateral data deviations signal ($LOC_{GNSS}$) is fed to high pass filter 314 ($1-G_L(S)$). The filtered lateral deviation signals output from filters 312 and 314 are combined in an adder 316, which outputs a stable lateral deviations signal ($LOC_{STABLE}$).

Also as shown in FIG. 3, a ILS or MLS glideslope deviations signal ($GS_{ILS}$) is fed to low pass filter 322 ($G_G(S)$), and a LPV or GLS vertical deviations signal ($GS_{GNSS}$) is fed to high pass filter 324 ($1-G_S(S)$). The filtered vertical deviation signals output from filters 322 and 324 are combined in an adder 326, which outputs a stable vertical deviations signal ($GS_{STABLE}$).

In one example embodiment, low pass filters 312 and 322 ($G_L(S)$ and $G_G(S)$) have time constants ($\tau$) of about 30 seconds. The time constants should be chosen such that the ILS can continually correct a drifting GNSS signal (e.g., a spoofed signal).

A processor used in the present system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. Various process tasks can include controlling spatial scanning and orientation, laser operation, photodetector control and operation, and awareness of system orientation and state. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a method comprising: receiving an in-flight instrument landing system (ILS) transmission signal in an onboard ILS receiver during an aircraft approach; receiving an in-flight global navigation satellite system (GNSS) position signal in an onboard GNSS augmentation system receiver during the aircraft approach; determining a first set of flight path deviations for the aircraft approach based on the ILS transmission signal; determining a second set of flight path deviations for the aircraft approach based on the GNSS position signal; sending the first set of flight path deviations to a first complementary filter, which is operative to output a first filtered deviations signal; sending the second set of flight path deviations to a second complementary filter, which is operative to output a second filtered deviations signal; applying a scale factor to the first filtered deviations signal or the second filtered deviations signal, such that the first and second filtered deviations signals are normalized to a same scale; and combining the normalized first and second sets of filtered deviations signals to produce a hybrid signal.

Example 2 includes the method of Example 1, further comprising: generating a test statistic for the hybrid signal; comparing the test statistic to a threshold to determine whether an integrity or safety issue exists; and presenting an alert if the threshold is exceeded.

Example 3 includes the method of Example 2, further comprising: applying a filter to the test statistic to reduce noise.

Example 4 includes the method of any of Examples 1-3, wherein the first complementary filter includes a first low pass filter and a first high pass filter.

Example 5 includes the method of Example 4, wherein a ILS localizer deviations signal is fed to the first low pass filter, and a GNSS lateral deviations signal is fed to the first high pass filter.

Example 6 includes the method of Example 5, wherein filtered lateral deviation signals output from the first low pass filter and the first high pass filter are combined in a first adder, which outputs a stable lateral deviations signal.

Example 7 includes the method of any of Examples 1-6, wherein the second complementary filter includes a second low pass filter and a second high pass filter.

Example 8 includes the method of Example 7, wherein a ILS glideslope deviations signal is fed to the second low pass filter, and a GNSS vertical deviations signal is fed to the second high pass filter.

Example 9 includes the method of Example 8, wherein filtered vertical deviation signals output from the second low pass filter and the second high pass filter are combined in a second adder, which outputs a stable vertical deviations signal.

Example 10 includes a system comprising: a processor; an instrument landing system (ILS) receiver responsive to in-flight reception of ILS transmission signals during an aircraft approach, the ILS receiver operative to generate an ILS output signal that is sent to the processor for determining a first set of flight path deviation data based on the ILS output signal; a global navigation satellite system (GNSS) receiver responsive to in-flight reception of GNSS signals during the aircraft approach, the GNSS receiver operative to generate a GNSS position output signal that is sent to the processor to determine a second set of flight path deviation data based on the GNSS position output signal; a first filter unit including a first complementary filter, the first filter unit operative to receive the first set of flight path deviation data, and output a first filtered flight path deviation signal; a second filter unit including a second complementary filter, the second filter unit operative to receive the second set of flight path deviation data, and output a second filtered flight path deviation signal; and a combiner operative to receive and combine the first and second filtered flight path deviation signals to generate a hybrid signal; wherein a scale factor is applied to the first filtered flight path deviation signal or the second filtered flight path deviation signal, such that the first and second filtered flight path deviation signals are normalized to a same scale.

Example 11 includes the system of Example 10, wherein the processor is operative to: generate a test statistic for the hybrid signal; compare the test statistic to a threshold level to determine whether an integrity or safety issue exists; and present an alert if the threshold level is exceeded.

Example 12 includes the system of Example 11, wherein the test statistic is filtered to reduce noise.

Example 13 includes the system of any of Examples 10-12, wherein: the ILS receiver is onboard an aircraft and coupled to a first antenna; the GNSS receiver is onboard the aircraft and coupled to a second antenna; and the processor is located in a flight computer of the aircraft.

Example 14 includes the system of any of Examples 10-13, wherein: the first complementary filter includes a first low pass filter and a first high pass filter; and a ILS localizer deviations signal is fed to the first low pass filter, and a GNSS lateral deviations signal is fed to the first high pass filter.

Example 15 includes the system of Example 14, wherein filtered lateral deviation signals output from the first low pass filter and the first high pass filter are combined in a first adder, which outputs a stable lateral deviations signal.

Example 16 includes the system of any of Examples 10-15, wherein: the second complementary filter includes a second low pass filter and a second high pass filter; and a ILS glideslope deviations signal is fed to the second low pass filter, and a GNSS vertical deviations signal is fed to the second high pass filter.

Example 17 includes the system of Example 16, wherein filtered vertical deviation signals output from the second low pass filter and the second high pass filter are combined in a second adder, which outputs a stable vertical deviations signal.

Example 18 includes the system of any of Examples 10-17, further comprising: an approach tuning database in operative communication with a tuning head and the ILS receiver; and a final approach segment (FAS) database operatively coupled to the approach tuning database, the FAS database configured to provide an input to the determination of the second set of flight path deviation data based on the GNSS position output signal.

Example 19 includes the system of any of Examples 10-18, wherein the scale factor is applied to the first filtered flight path deviation signal by a harmonize scaling module coupled to an output of first filter unit.

Example 20 includes the system of any of Examples 10-18, wherein the scale factor is applied to the second filtered flight path deviation signal by a harmonize scaling module coupled to an output of the second filter unit.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method comprising:
   receiving in an aircraft in-flight, an instrument landing system (ILS) transmission signal in an onboard ILS receiver, or a microwave landing system (MLS) transmission signal in an onboard MLS receiver, during a landing approach of the aircraft;
   receiving in the aircraft in-flight, a global navigation satellite system (GNSS) position signal in an onboard GNSS augmentation system receiver during the landing approach;
   determining, in an onboard processor, a first set of flight path deviations for the landing approach based on the ILS transmission signal or the MLS transmission signal;
   determining, in the processor, a second set of flight path deviations for the landing approach based on the GNSS position signal;
   sending the first set of flight path deviations to a first complementary filter, in the processor, which is operative to output a first filtered deviations signal, wherein the first complementary filter includes a first low pass filter and a first high pass filter, wherein a ILS or MLS localizer deviations signal is fed to the first low pass filter, and a GNSS lateral deviations signal is fed to the first high pass filter;
   sending the second set of flight path deviations to a second complementary filter, in the processor, which is operative to output a second filtered deviations signal, wherein the second complementary filter includes a second low pass filter and a second high pass filter, wherein a ILS or MLS glideslope deviations signal is fed to the second low pass filter, and a GNSS vertical deviations signal is fed to the second high pass filter;
   applying, in the processor, a scale factor to the first filtered deviations signal or the second filtered deviations signal, such that the first and second filtered deviations signals are normalized to a same scale;
   combining, in the processor, the normalized first and second sets of filtered deviations signals to produce a hybrid signal;
   computing, in the processor, final flight path deviation data with enhanced accuracy and integrity based on the hybrid signal; and
   sending the final flight path deviation data to a flight control system of the aircraft to provide navigation guidance during the landing approach of the aircraft.

2. The method of claim 1, further comprising:
   generating a test statistic for the hybrid signal;
   comparing the test statistic to a threshold to determine whether an integrity or safety issue exists; and
   presenting an alert if the threshold is exceeded.

3. The method of claim 2, further comprising:
   applying a filter to the test statistic to reduce noise.

4. The method of claim 1, wherein filtered lateral deviation signals output from the first low pass filter and the first high pass filter are combined in a first adder, which outputs a stable lateral deviations signal.

5. The method of claim 1, wherein filtered vertical deviation signals output from the second low pass filter and the second high pass filter are combined in a second adder, which outputs a stable vertical deviations signal.

6. A system comprising:
   a processor onboard an aircraft;
   an instrument landing system (ILS) receiver onboard the aircraft and responsive to in-flight reception of ILS transmission signals during a landing approach of the aircraft, the ILS receiver operative to generate an ILS output signal that is sent to the processor to determine a first set of flight path deviation data based on the ILS output signal;
   a global navigation satellite system (GNSS) receiver onboard the aircraft and responsive to in-flight reception of GNSS signals during the landing approach, the GNSS receiver operative to generate a GNSS position output signal that is sent to the processor to determine a second set of flight path deviation data based on the GNSS position output signal;
   a first filter unit including a first complementary filter in the processor, the first filter unit operative to receive the first set of flight path deviation data, and output a first filtered flight path deviation signal;

a second filter unit including a second complementary filter in the processor, the second filter unit operative to receive the second set of flight path deviation data, and output a second filtered flight path deviation signal; and a combiner in the processor, the combiner operative to receive and combine the first and second filtered flight path deviation signals to generate a hybrid signal;

wherein a scale factor is applied to the first filtered flight path deviation signal or the second filtered flight path deviation signal, in the processor, such that the first and second filtered flight path deviation signals are normalized to a same scale;

wherein:
the scale factor is applied to the first filtered flight path deviation signal by a harmonize scaling module coupled to an output of the first filter unit; or
the scale factor is applied to the second filtered flight path deviation signal by a harmonize scaling module coupled to an output of the second filter unit;

wherein the processor is operative to compute final flight path deviation data with enhanced accuracy and integrity based on the hybrid signal, and send the final flight path deviation data to a flight control system of the aircraft to provide navigation guidance during the landing approach of the aircraft.

7. The system of claim 6, wherein the processor is operative to:
generate a test statistic for the hybrid signal;
compare the test statistic to a threshold level to determine whether an integrity or safety issue exists; and
present an alert if the threshold level is exceeded.

8. The system of claim 7, wherein the test statistic is filtered to reduce noise.

9. The system of claim 6, wherein:
the ILS receiver is coupled to a first antenna;
the GNSS receiver is coupled to a second antenna; and
the processor is located in a flight computer of the aircraft.

10. The system of claim 6, wherein:
the first complementary filter includes a first low pass filter and a first high pass filter; and
a ILS localizer deviations signal is fed to the first low pass filter, and a GNSS lateral deviations signal is fed to the first high pass filter.

11. The system of claim 10, wherein filtered lateral deviation signals output from the first low pass filter and the first high pass filter are combined in a first adder, which outputs a stable lateral deviations signal.

12. The system of claim 6, wherein:
the second complementary filter includes a second low pass filter and a second high pass filter; and
a ILS glideslope deviations signal is fed to the second low pass filter, and a GNSS vertical deviations signal is fed to the second high pass filter.

13. The system of claim 12, wherein filtered vertical deviation signals output from the second low pass filter and the second high pass filter are combined in a second adder, which outputs a stable vertical deviations signal.

14. The system of claim 6, further comprising:
an approach tuning database in operative communication with a tuning head and the ILS receiver; and
a final approach segment (FAS) database operatively coupled to the approach tuning database, the FAS database configured to provide an input to the determination of the second set of flight path deviation data based on the GNSS position output signal.

15. The system of claim 6, wherein a weighted navigation solution is determined based on the hybrid signal, by combining together a weighted portion of an ILS solution based on the first set of flight path deviation data, and a weighted portion of a GNSS solution based on the second set of flight path deviation data.

16. A system comprising:
a processor onboard an aircraft;
an instrument landing system (ILS) receiver onboard the aircraft and responsive to in-flight reception of ILS transmission signals during a landing approach of the aircraft, the ILS receiver operative to generate an ILS output signal that is sent to the processor to determine a first set of flight path deviation data based on the ILS output signal;
a global navigation satellite system (GNSS) receiver onboard the aircraft and responsive to in-flight reception of GNSS signals during the landing approach, the GNSS receiver operative to generate a GNSS position output signal that is sent to the processor to determine a second set of flight path deviation data based on the GNSS position output signal;
an approach tuning database in operative communication with a tuning head and the ILS receiver; and
a final approach segment (FAS) database operatively coupled to the approach tuning database, the FAS database configured to provide an input to the determination of the second set of flight path deviation data based on the GNSS position output signal;
a first filter unit including a first complementary filter, the first filter unit operative to receive the first set of flight path deviation data, and output a first filtered flight path deviation signal;
a second filter unit including a second complementary filter, the second filter unit operative to receive the second set of flight path deviation data, and output a second filtered flight path deviation signal; and
a combiner operative to receive and combine the first and second filtered flight path deviation signals to generate a hybrid signal;
wherein a scale factor is applied to the first filtered flight path deviation signal or the second filtered flight path deviation signal, such that the first and second filtered flight path deviation signals are normalized to a same scale;
wherein the processor is operative to compute final flight path deviation data with enhanced accuracy and integrity based on the hybrid signal, and send the final flight path deviation data to a flight control system of the aircraft to provide navigation guidance during the landing approach of the aircraft.

17. The system of claim 16, wherein the processor is operative to:
generate a test statistic for the hybrid signal;
compare the test statistic to a threshold level to determine whether an integrity or safety issue exists; and
present an alert if the threshold level is exceeded.

18. The system of claim 16, wherein:
the first complementary filter includes a first low pass filter and a first high pass filter; and
a ILS localizer deviations signal is fed to the first low pass filter, and a GNSS lateral deviations signal is fed to the first high pass filter.

19. The system of claim 16, wherein:
the second complementary filter includes a second low pass filter and a second high pass filter; and
a ILS glideslope deviations signal is fed to the second low pass filter, and a GNSS vertical deviations signal is fed to the second high pass filter.

* * * * *